United States Patent
Engel et al.

(10) Patent No.: US 6,720,872 B1
(45) Date of Patent: Apr. 13, 2004

(54) GROUND FAULT/ARC FAULT CIRCUIT INTERRUPTER AND METHOD OF TESTING THE SAME WITH A TEST BUTTON AND A RESET BUTTON

(75) Inventors: Joseph C. Engel, Monroeville, PA (US); Robert T. Elms, Monroeville, PA (US); John C. Schlotterer, Murrysville, PA (US)

(73) Assignee: Eaton Corporation, Cleveland, OH (US)

( * ) Notice: Subject to any disclaimer, the term of this patent is extended or adjusted under 35 U.S.C. 154(b) by 90 days.

(21) Appl. No.: 10/197,647

(22) Filed: Jul. 16, 2002

(51) Int. Cl.⁷ .............................................. G08B 29/00
(52) U.S. Cl. ....................... 340/514; 340/635; 340/644; 340/3.43; 200/52 R; 324/415; 324/500; 324/509
(58) Field of Search .................. 340/514, 515, 340/635, 644, 686.1, 687, 3.43, 3.44; 200/42.01, 47, 51.11, 52 R; 324/415, 424, 500, 509

(56) References Cited

U.S. PATENT DOCUMENTS

| | | | |
|---|---|---|---|
| 4,595,894 A | 6/1986 | Doyle et al. | |
| 5,224,006 A | 6/1993 | MacKenzie et al. | |
| 5,459,630 A | 10/1995 | MacKenzie et al. | |
| 5,691,869 A | 11/1997 | Engel et al. | |
| 5,889,643 A | 3/1999 | Elms | |
| 5,982,593 A | 11/1999 | Kimblin et al. | |
| 6,040,967 A | 3/2000 | DiSalvo | |
| 6,215,378 B1 | 4/2001 | Gibson et al. | |
| 6,246,558 B1 | 6/2001 | DiSalvo et al. | |
| 6,282,070 B1 | 8/2001 | Ziegler et al. | |
| 6,285,534 B1 | 9/2001 | Gibson et al. | |
| 6,288,882 B1 | 9/2001 | DiSalvo et al. | |
| 6,309,248 B1 | 10/2001 | King | |
| 6,381,112 B1 | 4/2002 | DiSalvo | |
| 6,417,671 B1 * | 7/2002 | Tiemann | 324/509 |
| 6,552,549 B1 * | 4/2003 | Kaiser et al. | 324/550 |
| 6,593,751 B2 * | 7/2003 | Takahashi | 324/551 |

OTHER PUBLICATIONS

Underwriters Laboratories Inc. (UL), "UL Standard for Safety for Arc–Fault Circuit–Interrupters", UL 1699, Feb. 26, 1999, 83 pp.
Underwriters Laboratories Inc. (UL), "UL Standard for Safety for Ground–Fault Circuit–Interrupters", UL 943, Aug. 27, 1993, 87 pp.

* cited by examiner

Primary Examiner—Daryl Pope
(74) Attorney, Agent, or Firm—Martin J. Moran

(57) ABSTRACT

An arc fault/ground fault circuit interrupter for a power circuit includes a line terminal; a load terminal; and separable contacts electrically connected between the line and load terminals. An operating mechanism opens the separable contacts and has a closed position for closing the separable contacts. A trip mechanism cooperates with the operating mechanism to trip open the separable contacts. A ground fault protection circuit is operatively associated with the power circuit. An arc fault protection circuit is also operatively associated with the power circuit. A circuit tests the ground fault protection circuit, tests the arc fault protection circuit, and restores the operating mechanism to the closed position responsive to sequential activation of test and reset buttons.

26 Claims, 2 Drawing Sheets

GROUND FAULT/ARC FAULT CIRCUIT INTERRUPTER AND METHOD OF TESTING THE SAME WITH A TEST BUTTON AND A RESET BUTTON

BACKGROUND OF THE INVENTION

1. Field of the Invention

The invention relates to circuit interrupters and, more particularly, to ground fault/arc fault circuit interrupters. The invention also relates to methods of testing ground fault/arc fault circuit interrupters.

2. Background Information

During the early 1970's, people protecting ground fault circuit interrupters were introduced to provide protection against electrocution.

Today, people protecting ground fault circuit interrupters include both circuit breakers and receptacles. These devices are covered by Underwriters Laboratory (UL) Standard UL 943. The Standard UL 943 requires that a ground fault circuit interrupter (GFCI) device include a built-in test circuit including a test button, which allows a user to periodically test the device. When the test button is depressed, a simulated ground fault current is produced that causes the GFCI device to open if such device is operating properly. The device must be manually reset, in order to be returned to service. Otherwise, if the GFCI device has failed, then the device will not open in response to the test button.

Today, a ground fault receptacle employs two buttons, TEST and RESET. See, for example, U.S. Pat. No. 4,595,894.

Recently, a GFCI receptacle employing a "lockout" test procedure has been introduced. See U.S. Pat. Nos. 6,381,112; and 6,040,967. In this GFCI receptacle, the button labeled TEST simply manually opens the receptacle by freeing a spring charged trip mechanism, rather than by producing an artificial ground test current. The GFCI receptacle opens regardless whether it is functional. The actual test is performed when the RESET button is pushed. During this process, an artificial ground test current is generated and the trip spring is charged. If the GFCI receptacle passes the test, then the trip latch mechanism moves to a position such that when the RESET button is released, the spring is latched in the charged position and the contacts of the GFCI receptacle close. Otherwise, if the GFCI receptacle trip circuit is inoperable, then the spring is not latched and the contacts remain open. In this manner, if the GFCI receptacle fails the test, then it is unable to apply power to the protected circuit. See, for example, U.S. Pat. Nos. 6,309,248; 6,288,882; 6,282,070; 6,246,558; and 6,040,967.

An arc fault circuit interrupter (AFCI) provides protection against hazardous electrical arcing. UL Standard UL 1699 covers conformance testing of these devices and requires a mechanism to test the AFCI device via a TEST button as is required for a GFCI receptacle. In the case of the AFCI device, the test waveform simulates an arc fault. The Standard UL 1699 contemplates that someday a device (e.g., circuit breaker; receptacle) would be developed that meets both the requirements of a GFCI device and an AFCI device in a single package. In this case, the Standard UL 1699 requires that both functions be tested independently.

Some AFCI/GFCI circuit breakers may employ a first test button for an arc fault test and a second test button for a ground fault test. See, for example, U.S. Pat. No. 5,459,630.

U.S. patent application Ser. No. 09/069,355, filed Apr. 29, 1998, discloses a miniature circuit breaker with a common rocker button which is rotated in one direction to actuate the ground fault test circuit, and the opposite direction to actuate the arc fault test circuit. See, also, U.S. Pat. Nos. 6,215,378; and 6,285,534.

U.S. Pat. No. 5,982,593 discloses a circuit breaker including a ground fault test circuit for testing a ground fault detector trip mechanism, and an arc fault test circuit for testing an arc fault detector trip mechanism. A state machine circuit responsive to a single test push button automatically sequentially tests both of the ground fault and arc fault detector trip mechanisms.

The wiring device industry has spent years educating the consumer on the purpose and function of the two buttons labeled TEST and RESET on a GFCI device that, otherwise, looks like a conventional receptacle.

There is room for improvement in circuit interrupters, such as GFCI/AFCI devices.

SUMMARY OF THE INVENTION

In the case of a combined GFCI/AFCI circuit interrupter, such as a receptacle, it is desirable to retain the two-button TEST/RESET paradigm, while adding a new test for the AFCI function. It is desired, therefore, to retain only two buttons (i.e., TEST and RESET) for a GFCI/AFCI receptacle, while performing three functions, namely: an arc fault test, a ground fault test, and a mechanical reset of the receptacle.

As one aspect of the invention, a method of testing a circuit interrupter comprises engaging a test button; opening separable contacts responsive to the step of engaging the test button; testing an arc fault protection circuit responsive to the step of engaging the test button; engaging a reset button; testing a ground fault protection circuit responsive to the step of engaging the reset button; and closing the separable contacts responsive to successfully testing at least one of the arc fault protection circuit and the ground fault protection circuit.

The method may comprise energizing a trip coil responsive to successfully testing the arc fault protection circuit; and opening the separable contacts responsive to the step of energizing the trip coil.

The method may comprise activating an indicator responsive to successfully testing the arc fault protection circuit; and closing the separable contacts responsive to successfully testing the ground fault protection circuit.

The method may comprise closing the separable contacts responsive to successfully testing both of the arc fault protection circuit and the ground fault protection circuit.

Power may be removed from the ground fault protection circuit responsive to unsuccessfully testing the arc fault protection circuit.

As another aspect of the invention, a circuit interrupter for a power circuit comprises: a first terminal; a second terminal; separable contacts electrically connected between the first terminal and the second terminal; an operating mechanism for opening the separable contacts, the operating mechanism having a closed position for closing the separable contacts; a trip mechanism cooperating with the operating mechanism to trip open the separable contacts; a ground fault protection circuit operatively associated with the power circuit; an arc fault protection circuit operatively associated with the power circuit; a test button; a reset button; and means for testing the ground fault protection circuit, testing the arc fault protection circuit, and restoring the operating mechanism to the closed position responsive to sequential activation of the test button and the reset button.

The reset button may have an engaged position, and the means for testing includes a ground fault test circuit producing a ground fault test current for the ground fault protection circuit responsive to the engaged position of the reset button. The reset button may further have an disengaged position. The trip mechanism may include a trip solenoid. The ground fault protection circuit may energize the trip solenoid after a successful test of the ground fault protection circuit with the ground fault test current. The operating mechanism may move to the closed position responsive to the reset button moving from the engaged position to the disengaged position in order to close the separable contacts.

The means for testing may include means for restoring the operating mechanism to the closed position to close the separable contacts after successful test of both of the ground fault protection circuit and the arc fault protection circuit.

The means for testing may include means for indicating a successful test of the arc fault protection circuit.

As another aspect of the invention, a method of testing a circuit interrupter comprises the steps of: engaging a test button; opening separable contacts responsive to the step of engaging the test button; testing a first fault protection circuit responsive to the step of engaging the test button; engaging a reset button; testing a second fault protection circuit responsive to the step of engaging the reset button; and closing the separable contacts responsive to successfully testing at least one of the first and second fault protection circuits.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Solutions to using only two buttons to provide three functions, namely, an AFCI test, a GFCI test, and a circuit interrupter RESET, are disclosed herein. These solutions also address the problem of inadvertent "lockout" on a test failure.

Figure 1:
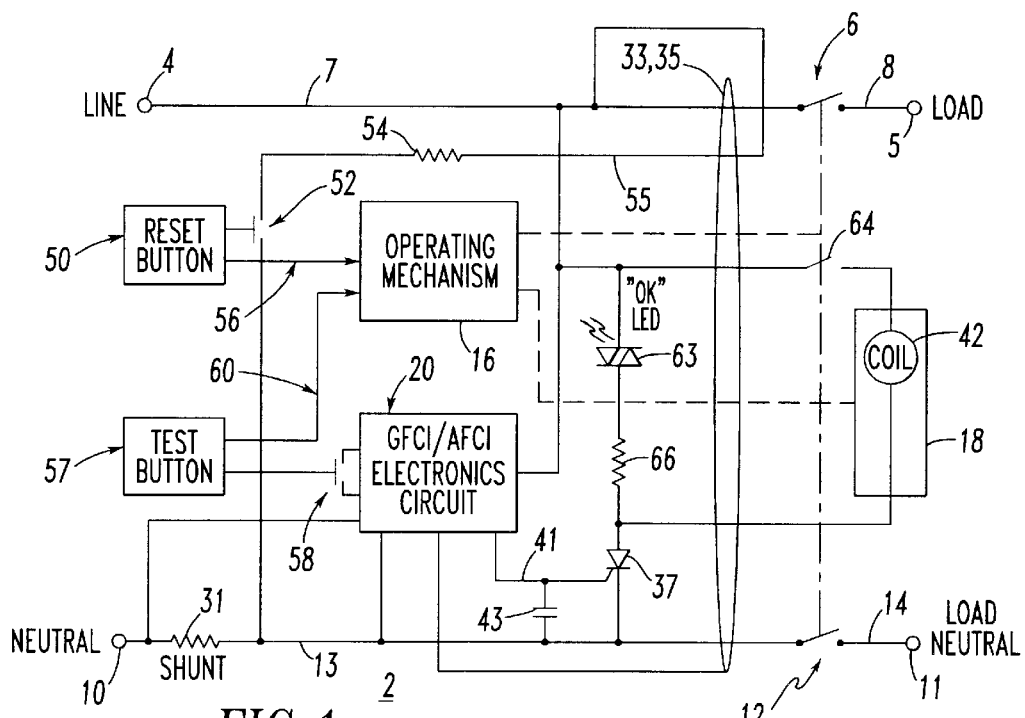
FIG. 1 is a block diagram in schematic form of a GFCI/AFCI receptacle in accordance with the present invention.

Referring to FIG. 1, a circuit interrupter, such as GFCI/AFCI receptacle 2 is disclosed. Although GFCI/AFCI receptacles are disclosed herein, the invention is applicable to any GFCI/AFCI device, such as, for example, a circuit breaker, a relay, a contactor, or a motor starter. As is conventional, the receptacle 2 includes a first (line) terminal 4 and a second (load) terminal 5, with separable contacts 6 electrically connected between such terminals 4,5 by conductors 7,8, respectively. The receptacle 2 also includes a neutral terminal 10, a load neutral terminal 11, with separable contacts 12 electrically connected between such terminals 10,11 by conductors 13,14, respectively. The receptacle 2 functions in a power circuit, which receives power from the line/neutral terminals 4,10 and delivers power to the load/load neutral terminals 5,11. An operating mechanism 16 has an operating linkage 17 (shown in FIG. 3) with a first or open position to open the separable contacts 6,12, and a second or closed position to close such separable contacts. A suitable trip mechanism, such as a trip solenoid 18, cooperates with the operating mechanism 16 to trip open the separable contacts 6,12.

Figure 2:
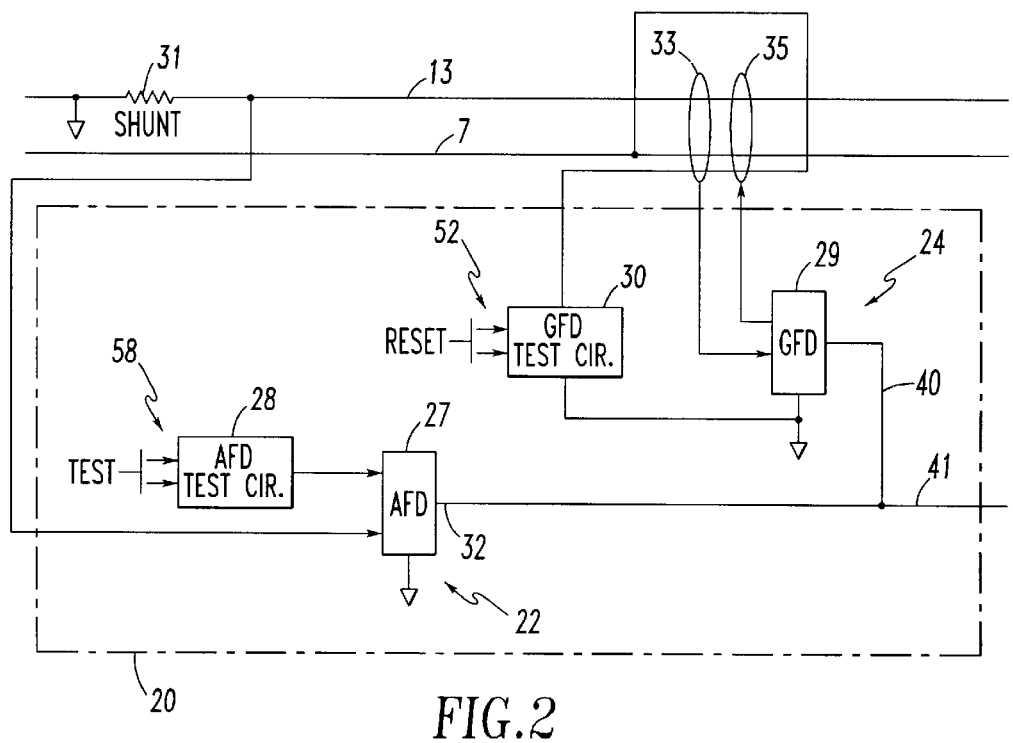
FIG. 2 is a block diagram in schematic form of the GFCI/AFCI electronics circuit of FIG. 1.

As shown in FIG. 2, a GFCI/AFCI electronics circuit 20 includes an arc fault protection circuit 22 and a ground fault protection circuit 24 operatively associated with the power circuit. The arc fault protection circuit 22 includes an arc fault detector (AFD) 27 and an arc fault test circuit 28. The ground fault protection circuit 24 includes a ground fault detector (GFD) 29 and a ground fault test circuit 30. The arc fault detector 27 may be, for instance, of the type which detects the step increases in current which occur each time an arc is struck, although a wide variety of arc fault detectors may also be used. Suitable arc fault detectors are disclosed, for instance, in U.S. Pat. No. 5,224,006, with a preferred type described in U.S. Pat. No. 5,691,869, which is hereby incorporated by reference.

The exemplary arc fault detector 27 senses the current in the power circuit by monitoring the voltage across a shunt 31 to sense an arc fault current condition. The shunt 31 detects arcing from load-to-load neutral and, also, may detect a load-to-ground arcing, although this isn't necessary, since this is a ground fault. If the circuit interrupter was miswired such that the input neutral connection was connected the utility line connection, then a load neutral-to-ground arcing fault would not be detected, since the shunt would see no current. This is not a problem, however, since this again is a ground fault that would be sensed. In the case of an arc fault only configuration, then both load and load neutral currents are sensed. See, for example, U.S. Pat. No. 5,889,643. As described in U.S. Pat. No. 5,691,869, the arc fault detector 27 includes circuitry, which generates a pulse in response to each step change in current. The pulse signal is integrated with the result of the integration being attenuated over time. When the time attenuated accumulation of the pulses reaches a selected level, the arc fault detector 27 generates at its output an arc fault trip signal 32, which is active in response to the arc fault. In turn, the signal 32 is combined with the output signal 40 of the ground fault detector 29 and is employed to actuate the operating mechanism 16 through the trip solenoid 18 and open the separable contacts 6,12 in response to the fault.

The ground fault detector (GFD) 29 may employ, for example, the well known dormant oscillator technique for sensing a load side grounded-neutral condition, without requiring a connected load. Two magnetic elements are employed. The first magnetic element is a differential current transformer 33, which produces an output proportional to the difference in the current flowing to the load through conductor 7 and the current returning from the load through conductor 13. The difference is the ground current. The second magnetic element is a voltage transformer 35, the primary of which is energized by the output of a ground fault sense amplifier (not shown), which is part of GFD 29. The transformer 35 has two single turn secondaries formed by passing conductors 7 and 13 through its core. The polarities of the primary and secondary windings of transformer 35 are such that the ground-fault sense-amplifier output induces a voltage on the secondary of transformer 35, such as conductor 7, which voltage increases the ground current caused by a load neutral-to-ground fault. This increased ground current increases the sense amplifier output, thereby resulting in a positive feedback condition increase in the ground current. If the load neutral-to-ground impedance is less than about 2 ohms, this positive feedback may become unstable, which results in a monotonic increase in the induced ground fault current in conductor 7 until the ground fault trip level is exceeded and the receptacle 2 (FIG. 1) trips. Both conductors 7 and 13 are passed through the core to cover the case where the input leads are reversed. If the arc fault detector 27 detects an arc fault in the power circuit, then the trip signal 32 is generated, which turns on a suitable switch, such as the silicon-controlled rectifier (SCR) 37 of FIG. 1, in order to energize the trip solenoid 18.

When the ground fault detector 29 detects a ground fault, it generates at its output the ground fault trip signal 40, which is active in response to the ground fault. The ground fault trip signal 40 is "ORed" with the arc fault trip signal 32 (i.e., an "OR" function of the outputs of the ground fault detector 29 and the arc fault detector 27), such that the combination of the signals 32,40 forms a fault protection trip signal 41.

Under normal operation, the trip signal 41 turns the SCR 37 on, which energizes the trip solenoid 18 and, thereby, actuates the operating mechanism 16 (shown in FIG. 1) to open the separable contacts 6,12 in response to the arc fault or ground fault. A resistor (not shown) in series with the coil 42 of the solenoid 18 limits the coil current and a capacitor 43 protects the gate of the SCR 37 from voltage spikes and false tripping due to noise. In this manner, either the arc fault condition or the ground fault condition results in the interruption of electrical power independent of the other.

A conventional reset button 50 outputs a pair of normally open separable contacts 52, which are electrically connected in series with a ground test current resistor 54 between the conductors 7,13. A conductor 55 of the series combination of the separable contacts 52 and the resistor 54 passes through the sensing coils 33,35 and, thus, simulates a suitable ground fault test current when the separable contacts 52 are closed in response to the engaged position of the reset button 50. In response to a successful test of the ground fault detector 29 with the ground fault test current, the ground fault detector 29 energizes the trip solenoid 18 through the SCR 37 to open the separable contacts 6,12. The reset button 50 also includes a mechanical linkage 56 with the operating mechanism 16, which serves to unlatch the operating mechanism 16 when the reset button is in an engaged position, and which latches the operating mechanism 16 in the closed position when the reset button 50 is moved from the engaged position to the disengaged position in order to close the separable contacts 6,12. If, however, there was no trip (e.g., due to a failure of the ground fault detector 29), then the separable contacts 6,12 would simply stay open.

Figure 3:
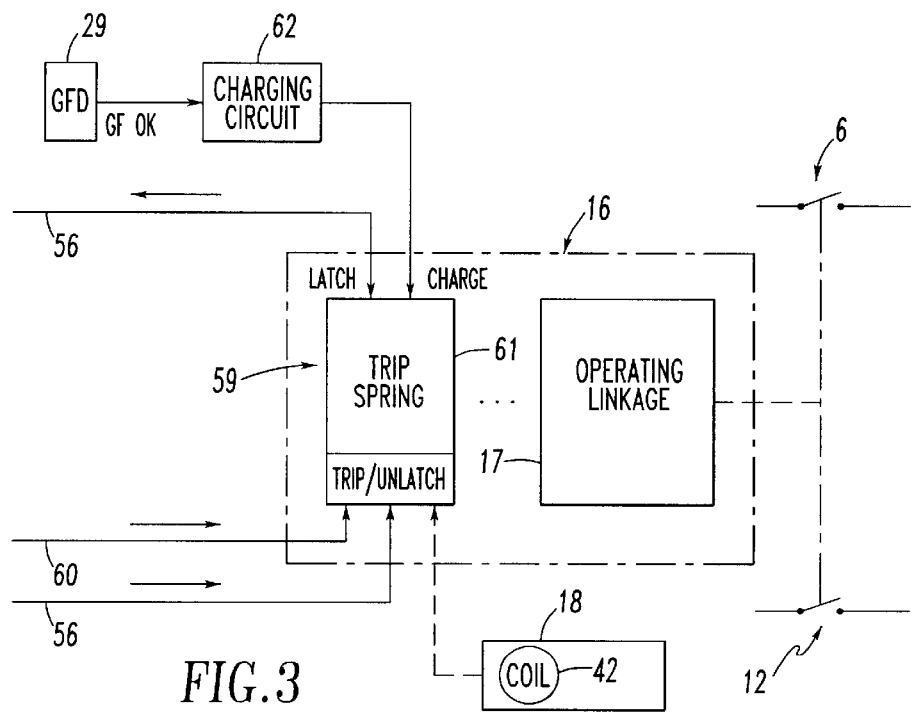
FIG. 3 is a block diagram of the operating mechanism of FIG. 1.

In accordance with the invention, a test button 57 outputs a pair of normally open separable contacts 58, which are electrically connected with the arc fault test circuit 28. The test button 57 also includes a mechanical linkage 60 with the operating mechanism 16, which serves to unlatch the operating mechanism 16 (i.e., by freeing a trip mechanism 59, which is charged by a trip spring 61 as shown in FIG. 3) when the test button 57 is fully engaged. When the separable contacts 58 are closed, in response to the test button 57 being fully engaged, the arc fault test circuit 28 performs a test of the arc fault detector 27. If this test is successful, then the arc fault detector 27 energizes the trip solenoid 18 through the SCR 37 to trip open the separable contacts 6,12.

The receptacle 2 of FIG. 1 provides lockout only on failure of the test of the ground fault detector 29. An indicating device, such as light emitting diode (LED) 63, provides a visual indication of the successful test ("OK") of the arc fault detector 27. When the test button 57 is engaged (e.g., pushed), the mechanical linkage 60 unlatches the operating mechanism 16, thereby causing the separable contacts 6,12 to open as is conventional. In accordance with the invention, engaging the test button 57 also closes the separable contacts 58 (e.g., a momentary switch), which initiates the test circuit 28 and causes an arc fault test of the arc fault detector 27 to be performed. Whenever that test is successful, the trip coil 42 of the trip solenoid 18 is energized by the SCR 37 in response to the trip signal 32 from the arc fault detector 27, in order to open the separable contacts 6,12. In turn, the auxiliary contact 64, which follows the state of the separable contacts 6,12, opens and de-energizes the trip solenoid trip coil 42. With the receptacle 2 already opened by the mechanical action of the test button 57 and linkage 60, the auxiliary contact 64 de-energizes the trip coil 42 even if the test button 57 is continually depressed.

The LED 63 is lit by current flowing between the line terminal 4, conductor 7, LED 63, resistor 66, SCR 37, conductor 13, shunt 31 and neutral terminal 10 when the SCR 37 is turned on, thereby indicating that the receptacle 2 has passed the arc fault test. The "OK" LED 63 continually lights until the test button 57 is released. Disengaging the test button 57 opens the separable contacts 58, which disables the test circuit 28 and causes the trip signal 32 to go to the inactive state.

The SCR 37 is turned off each half cycle when the line-to-neutral voltage reverses. The LED 63 is on for each positive half cycle until the SCR gate drive (trip signal 41) is removed. The diode shown in inverse parallel across the LED 63 is employed to ensure that the reverse voltage appears across the SCR 37.

The receptacle 2 initiates testing of the ground fault protection circuit 24 responsive to engaging (e.g., pressing) the reset button 50. If this testing is successful, then the trip spring 61 is charged by charging circuit 62 and the trip mechanism 59 moves to a charged position such that when the reset button 50 is released, the trip spring 61 is latched in the charged position by the mechanical linkage 56 and the separable contacts 6 are closed. This restores the operating mechanism 16 to the closed position to close the separable contacts 6,12 after successful test of the ground fault protection circuit 24. This returns the receptacle 2 to the closed position and arms the same to trip in the event of a subsequent ground fault or arc fault. Otherwise, if this testing is unsuccessful, then the trip spring 61 is not charged or latched and the separable contacts 6,12 remain open. Also, if there was an unsuccessful test of the arc fault protection circuit 22, then the "OK" LED 63 was not illuminated during that test.

The two buttons 50,57, the two test circuits 30,28 and the LED 63 provide a mechanism for testing the ground fault protection circuit 24, testing the arc fault protection circuit 22, and restoring the operating mechanism 16 to the closed position responsive to sequential activation of the test button 57 and the reset button 50.

Figure 4:
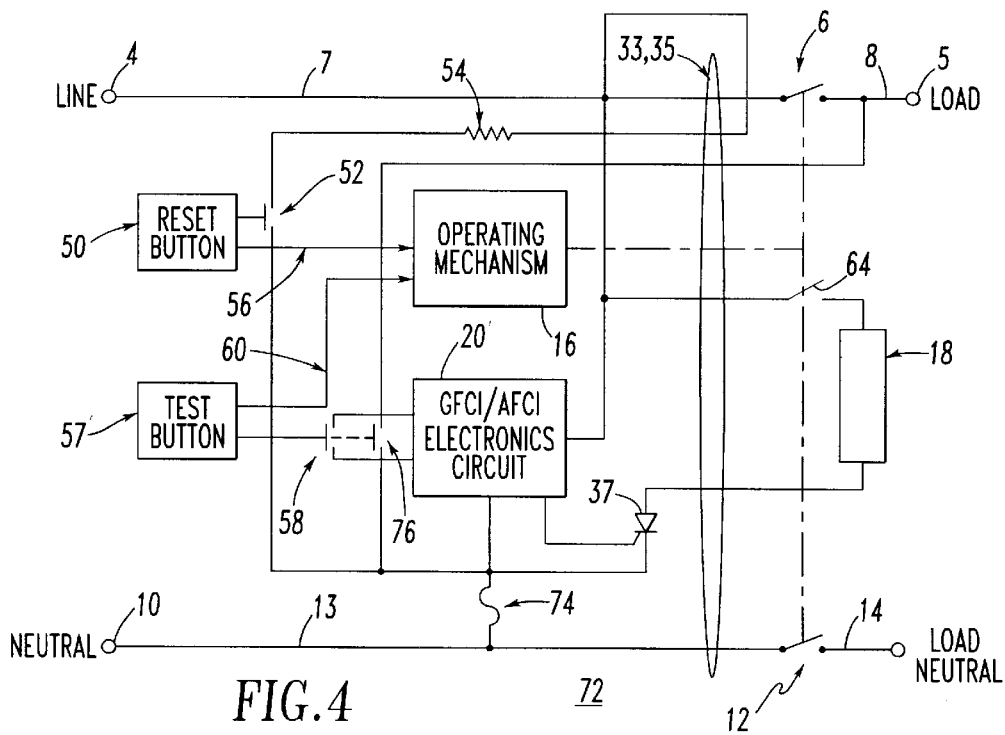
FIG. 4 is a block diagram in schematic form of a GFCI/AFCI receptacle in accordance with another embodiment of the present invention.

The receptacle 72 of FIG. 4 provides lockout on either ground fault or arc fault failure as well as protection against "back wiring" of the receptacle. It is important that the receptacle 72 be powered from the line input terminals 4 and 10. The load terminals 5 and 11 are directly electrically connected to female terminals (not shown) on the face of the receptacle. When the protective circuit trips and opens separable contacts 6 and 12, downstream outlets (not shown) are de-energized as well as the terminals (not shown) on the face of the receptacle itself. Backwiring occurs when power is applied by mistake to the load terminals 5 and 11 rather than the line terminals 4 and 10. When the protective circuit trips, power will still be applied to the terminals on the face of the receptacle creating an unsafe condition.

The receptacle 72 is similar to the receptacle 2 of FIG. 1, except that: (1) the "OK" LED 63 is eliminated (along with the resistor 66 and the requirement for the user to visually determine the result of the arc fault test) and is replaced with a permanent lockout if the arc fault test fails; (2) a fusible link, such as fuse 74, is added; and (3) the test button 57' includes the pair of normally open separable contacts 58 (e.g., momentary switch, like receptacle 2) and a second pair of separable contacts 76, which separable contacts 58,76 are activated in sequence as the test button 57' is depressed. Thus, the contacts 58 are closed responsive to engaging the test button 57', and the contacts 76 are closed a suitable time later. For example, the time is established by the velocity with which the test button 57' is pushed. The mechanical design of this two-pole switch is such that the separable contacts 58 are closed before the separable contacts 76 because of mechanical spacing within the switch. The contacts 76 are electrically connected in series with the fuse 74 between the conductor 8 and the load terminal 5 at one end and the conductor 13 and the ground or neutral terminal 10 at the other end. This second pair of contacts 76 functions with the operating mechanism 16 that opens the separable contacts 6,12.

When the test button 57' is initially depressed, this closes the first pair of separable contacts 58 and initiates the arc fault test as discussed above in connection with FIG. 1. If the arc fault test is successful, then the receptacle 72 trips and the separable contacts 6,12 are opened. Further depression of the test button 57' activates the second pair of contacts 76, which electrically connects the voltage of the load terminal 5 to the neutral terminal 10 through the conductors 8,13 and the fuse 74.

The ground fault test circuit 30 (FIG. 2) is powered from the line terminal 4 through the current limiting resistor 54, through the closed separable contacts 52, through the fuse 74, and through the conductor 13 to the ground or neutral terminal 10. The value of the current limiting resistor 54 is chosen to establish a ground fault test current which is approximately 200% of the specified ground fault trip current (e.g., 10 mA for a 5 mA trip specification). An unsuccessful test of the arc fault protection circuit 22 (FIG. 2) leaves the separable contacts 6 closed. As a result, when the separable contacts 76 are closed, this completes the circuit between the line terminal 4 through the closed separable contacts 6, through the closed separable contacts 76, through the fuse 74, and through the conductor 13 to the ground or neutral terminal 10. Unlike the separable contacts 52 and the current limiting resistor 54 for the ground fault test circuit 30, no current limiting resistor is employed with the separable contacts 76. Alternatively, a resistor (not shown) having a resistance, which is suitably less than the resistance of resistor 54, may be employed in series with the separable contacts 76 and the fuse 74 with a suitable rating of the fuse 74, in order that the fuse 74 does not blow when the separable contacts 52 are closed, but does blow when the separable contacts 6 and 76 are closed.

If the receptacle 72 (e.g., separable contacts 6) fails to trip prior to the closure of the second pair of contacts 76, then the line voltage, which is present on the load terminal 5, opens the fuse 74, which otherwise electrically connects the GFCI/ AFCI electronics circuit 20' to the conductor 13 and the neutral terminal 10. With the fuse 74 being blown, the reset function through the reset button 50, the separable contacts 52 and the mechanical linkage 56 are unable to restore power to the load terminal 5, since the GFCI/AFCI electronics circuit 20' is unpowered and there could be no ground fault test current. Finally, at the end of travel, regardless of an unsuccessful or successful test of the arc fault protection circuit 22, the test button mechanical linkage 60 unlatches the operating mechanism trip spring 61 (FIG. 3) when the test button 57' is fully engaged. For a successful test of the arc fault protection circuit 22 (FIG. 2), this opens the separable contacts 6 responsive to the successful test, and removes power from the load terminal 5 without opening the fuse 74. On the other hand, for an unsuccessful test of the arc fault protection circuit 22, the separable contacts 6 initially remain closed responsive to the unsuccessful test. In turn, power from the load terminal 5 opens the fuse 74, when the separable contacts 76 are closed. Finally, the separable contacts 6 are opened responsive to the mechanical linkage 60 after the separable contacts 76 are closed.

Except as indicated below, when the reset button 50 is pressed, the receptacle 72 operates like the receptacle 2 of FIG. 1. First, pressing the reset button 50 produces an artificial ground fault test current, which flows between the line terminal 4 and the ground or neutral terminal 10, and through the series combination of the conductor 7, the current limiting resistor 54, the closed separable contacts 52, the fuse 74 and the conductor 13. The operating mechanism 16 responds to the reset button mechanical linkage 56 to close the separable contacts 6,12 upon release of the reset button 50 only if the ground fault test circuit 30 successfully tested the ground fault protection circuit 24 (FIG. 2). However, in this embodiment, a successful test of the ground fault protection circuit 24 is not possible if the fuse 74 is blown. When the arc fault test circuit 28 performs an unsuccessful test of the arc fault protection circuit 22 (FIG. 2), the fuse 74 is opened by current flowing through the fuse 74 between the line terminal 4 and the ground or neutral terminal 10, thereby removing power from the ground fault protection circuit 24 and permanently removing power from the GFCI/AFCI electronics circuit 20'. With the fuse 74 blown, the test of the ground fault protection circuit 24 is unsuccessful and the separable contacts 6 remain open, thereby blocking the reapplication of power to the load terminal 5. Hence, operation of the reset button 50 reapplies power to the load terminal 5 only if both the tests of the arc fault protection circuit 22 and the ground fault protection circuit 24 are successful.

If power is not applied to the line terminal 4, then there is no energy to blow the fuse 74. Hence, the test sequence of the test button 57' followed by the reset button 50 cannot open the fuse 74. This addresses the problem of backwiring as without power on the line input terminals 4,10, after the arc trip occurs, it will be impossible to run a ground fault test to reset the unit.

Although reference is made to testing an arc fault protection circuit 22 responsive to engaging a test button 57, and testing a ground fault protection circuit 24 responsive to engaging a reset button 50, it will be appreciated that the invention is applicable to other test sequences (e.g., testing a ground fault protection circuit responsive to engaging a test button, and testing an arc fault protection circuit responsive to engaging a reset button) and to a wide range of other fault protection circuits (e.g., over current; over/under voltage; over/under frequency).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of testing a circuit interrupter, said method comprising the steps of:

engaging a test button;

opening separable contacts responsive to said step of engaging the test button;

testing an arc fault protection circuit responsive to said step of engaging the test button;

engaging a reset button;

testing a ground fault protection circuit responsive to said step of engaging the reset button; and closing said separable contacts responsive to successfully testing at least one of said arc fault protection circuit and said ground fault protection circuit.

2. The method recited in claim 1 further comprising:

energizing a trip coil responsive to successfully testing said arc fault protection circuit; and opening said separable contacts responsive to said step of energizing said trip coil.

3. The method recited in claim 2 further comprising:

opening an auxiliary contact responsive to said step of opening said separable contacts; and de-energizing said trip coil responsive to said step of opening the auxiliary contact.

4. The method recited in claim 1 further comprising:

activating an indicator responsive to successfully testing said arc fault protection circuit; and closing said separable contacts 6 responsive to successfully testing said ground fault protection circuit.

5. The method recited in claim 4 further comprising:

closing a switch responsive to said step of engaging the test button; and testing said arc fault protection circuit responsive to said step of closing the switch.

6. The method recited in claim 5 further comprising:

lighting said indicator responsive to successfully testing said arc fault protection circuit.

7. The method recited in claim 6 further comprising:

extinguishing said indicator responsive to disengaging said test button.

8. The method recited in claim 1 further comprising:

closing said separable contacts responsive to successfully testing both of said arc fault protection circuit and said ground fault protection circuit.

9. The method recited in claim 1 further comprising:

removing power from said ground fault protection circuit responsive to unsuccessfully testing said arc fault protection circuit.

10. The method recited in claim 9 further comprising:

opening a fuse responsive to unsuccessfully testing said arc fault protection circuit.

11. The method recited in claim 1 further comprising:

closing a switch responsive to said step of engaging the test button; and testing said arc fault protection circuit responsive to said step of closing the switch.

12. The method recited in claim 11 further comprising:

opening said separable contacts responsive to successfully testing said arc fault protection circuit.

13. The method recited in claim 11 further comprising:

employing a first switch as said switch responsive to said step of engaging the test button;

closing a second switch after said step of closing said first switch;

electrically connecting said second switch in series with a fuse; and electrically connecting a load terminal with a neutral or ground terminal through said second switch and said fuse.

14. The method recited in claim 13 further comprising:

opening said separable contacts responsive to successfully testing said arc fault protection circuit; and removing power from said load terminal without opening said fuse.

15. The method recited in claim 13 further comprising:

opening said fuse responsive to unsuccessfully testing said arc fault protection circuit; and removing power from said ground fault protection circuit responsive to said step of opening said fuse.

16. The method recited in claim 15 further comprising:

disabling closure of said separable contacts responsive to said step of removing power from said ground fault protection circuit.

17. The method recited in claim 13 further comprising:

opening said separable contacts after said step of closing the second switch.

18. A circuit interrupter for a power circuit, said device comprising:

a first terminal;

a second terminal;

separable contacts electrically connected between said first terminal and said second terminal;

an operating mechanism for opening said separable contacts, said operating mechanism having a closed position for closing said separable contacts;

a trip mechanism cooperating with said operating mechanism to trip open said separable contacts;

a ground fault protection circuit operatively associated with said power circuit;

an arc fault protection circuit operatively associated with said power circuit;

a test button;

a reset button; and means for testing said ground fault protection circuit, testing said arc fault protection circuit, and restoring said operating mechanism to the closed position responsive to sequential activation of said test button and said reset button.

19. The circuit interrupter recited in claim 18 wherein said reset button has an engaged position; and wherein said means for testing includes a ground fault test circuit producing a ground fault test current for said ground fault protection circuit responsive to the engaged position of said reset button.

20. The circuit interrupter recited in claim 19 wherein said reset button further has an disengaged position; wherein said trip mechanism includes a trip solenoid; wherein said ground fault protection circuit energizes said trip solenoid after a successful test of said ground fault protection circuit with said ground fault test current; and wherein said operating mechanism moves to the closed position responsive to said reset button moving from said engaged position to said disengaged position in order to close said separable contacts.

21. The circuit interrupter recited in claim 19 wherein said means for testing includes means for restoring said operating mechanism to the closed position to close said separable contacts after successful test of both of said ground fault protection circuit and said arc fault protection circuit.

22. The circuit interrupter recited in claim 19 wherein said means for testing includes means for indicating a successful test of said arc fault protection circuit.

23. The circuit interrupter recited in claim 19 wherein said test button includes a first switch and a second switch, said first switch closing before said second switch; and wherein said means for testing includes an arc fault test circuit, a ground fault test circuit, a ground or neutral terminal and a fuse electrically connected in series with said second switch, the series combination of said fuse and said second switch being electrically connected between said second terminal and said ground or neutral terminal, said ground fault test circuit being powered from said first terminal through said fuse to said ground or neutral terminal, said arc fault test circuit performing said test of said arc fault protection circuit responsive to said first switch being closed.

24. The circuit interrupter recited in claim 23 wherein when said arc fault test circuit performs an unsuccessful test of said arc fault protection circuit, said fuse is opened by current flowing from said second terminal through said fuse to said ground or neutral terminal, thereby removing power from said ground fault protection circuit.

25. The circuit interrupter recited in claim 23 wherein said trip mechanism includes a trip coil; and wherein when said arc fault test circuit performs a successful test of said arc fault protection circuit, said arc fault test circuit energizes said trip coil to trip open said separable contacts, thereby removing power from said second terminal.

26. A method of testing a circuit interrupter, said method comprising the steps of:

engaging a test button;

opening separable contacts responsive to said step of engaging the test button;

testing a first fault protection circuit responsive to said step of engaging the test button;

engaging a reset button;

testing a second fault protection circuit responsive to said step of engaging the reset button; and closing said separable contacts responsive to successfully testing at least one of said first and second fault protection circuits.

* * * * *